United States Patent
Ullah et al.

(10) Patent No.: US 12,493,789 B2
(45) Date of Patent: Dec. 9, 2025

(54) COOPERATIVE TRAINING MIGRATION

(71) Applicant: RAKUTEN MOBILE, INC., Tokyo (JP)

(72) Inventors: Rehmat Ullah, Belfast (GB); Di Wu, Belfast (GB); Paul Harvey, Tokyo (JP); Peter Kilpatrick, Belfast (GB); Ivor Spence, Belfast (GB); Blesson Varghese, Belfast (GB)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/770,049

(22) PCT Filed: Mar. 23, 2022

(86) PCT No.: PCT/US2022/021587
§ 371 (c)(1),
(2) Date: Apr. 19, 2022

(87) PCT Pub. No.: WO2023/069130
PCT Pub. Date: Apr. 27, 2023

(65) Prior Publication Data
US 2024/0303478 A1    Sep. 12, 2024

Related U.S. Application Data

(60) Provisional application No. 63/270,518, filed on Oct. 21, 2021.

(51) Int. Cl.
*G06N 3/0464* (2023.01)
*G06N 3/08* (2023.01)

(52) U.S. Cl.
CPC ..................... *G06N 3/08* (2013.01)

(58) Field of Classification Search
CPC ....... G06N 3/0464; G06N 3/084; G06N 3/098
See application file for complete search history.

(56) References Cited

U.S. PATENT DOCUMENTS

2021/0406652 A1* 12/2021 Pogorelik ........... G06F 21/6245
2022/0197714 A1*  6/2022 Raumann ............ G06F 15/7867

* cited by examiner

*Primary Examiner* — Grace Park
(74) *Attorney, Agent, or Firm* — HAUPTMAN HAM, LLP (57) ABSTRACT

Cooperative training migration is performed by training, cooperatively with a computational device through a network, the neural network model, creating, during the iterations of training, a data checkpoint, the data checkpoint including the gradient values and the weight values of the server partition, the loss value, and an optimizer state, receiving, during the iterations of training, a migration notice, the migration notice including an identifier of a second edge server, and transferring, during the iterations of training, the data checkpoint to the second edge server.

20 Claims, 7 Drawing Sheets

COOPERATIVE TRAINING MIGRATION

CROSS-REFERENCE TO RELATED APPLICATIONS

The present application is a National Phase of International Application No. PCT/US2022/021587, filed Mar. 23, 2022, which claims priority to U.S. Provisional Patent Application Ser. No. 63/270,518, filed on Oct. 21, 2021, the contents of which are hereby incorporated by reference in its entirety.

BACKGROUND

Internet applications that rely on classic machine learning (ML) techniques gather data from mobile and Internet-of-Things (IoT) devices and process them on servers in cloud data centers. Limited uplink network bandwidth, latency sensitivity of applications and data privacy concerns are key challenges in streaming large volumes of data generated by devices to geographically distant clouds. The concept of Federated Learning (FL) provides privacy by design in an ML technique that collaboratively learns across multiple distributed devices without sending raw data to a central server while processing data locally on devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

Federated learning (FL) is a privacy-preserving distributed machine learning technique that trains models without having direct access to the original data generated on devices. Since devices may be resource constrained, offloading can be used to improve FL performance by transferring computational workload from devices to edge servers. However, due to mobility, devices participating in FL may leave the network during training and need to connect to a different edge server. This is challenging because the offloaded computations from edge server need to be migrated. In line with this assertion, at least some embodiments of the present invention migrate Deep Neural Network (DNN) when devices move between edge servers during FL training. In empirical results on the CIFAR-10 dataset, with both balanced and imbalanced distribution, suggest that at least some embodiments of the present invention can reduce training time by up to 33% when a device moves after 50% of the training is completed, and by up to 45% when 90% of the training is completed. At least some embodiments of the present invention have substantially negligible overhead of 2 seconds without significantly compromising accuracy.

FL is a privacy-preserving technique in which an ML model is collaboratively trained across several participating distributed computational devices. In an FL system, data generated by a computational device that is used for training resides local to the computational device. In an FL system, a central server initiates a global model and distributes model parameters to connected computational devices. Then, each computational device trains a local version of the ML model using local data. Instead of sending the raw data to the central server, the local model parameter updates are transmitted to the central server. Subsequently, the central server computes a weighted average using the parameter updates on the central server, such as by using the Federated Averaging (FedAvg) algorithm, to obtain a new set of parameters for the global model. The updated global model is then transmitted back to each computational device for the next round of training by the computational device. The process is repeated until the model converges.

Running FL across resource constrained devices, for example in an IoT environment, increases the likelihood of long training times. Partitioning and offloading the ML model, such as a DNN, increases options for performance efficiency. Split Learning (SL) is one ML technique that leverages performance efficiency in partitioning and offloading the ML model.

In SL, a DNN, for example, is partitioned between a computational device and a server. The DNN layer after which the model is partitioned is referred to as the split layer. The computational device trains the model up to the split layer, sending feature maps of the model up to the split layer, which may also be referred to as smashed data, intermediate representations, etc., to the server. The server trains the remaining layers of the DNN using the feature maps. The server performs back-propagation, for example, up to the split layer and sends gradients of the split layer to the computational devices. The computational devices use the gradients to perform back-propagation on the rest of the DNN.

Another approach is to leverage computational resources offered by edge servers (located at the edge of the network)

for training, by offloading computations of the ML model, such as a DNN, from a computational device to an edge server for FL by splitting the ML model, referred to as edge-based FL. However, device mobility presents a challenge to efficiency that has not been considered within the context of edge-based FL.

Mobile devices participating in edge-based FL may need to move from one edge server to another (for example, a smartphone or a drone moving from the connectivity of one edge node to another). This movement affects the performance of edge-based FL, increasing training time. A device that changes edge servers without migration of the accompanying training data from the origin edge server to the destination edge server will result in training for the computational device to start all over again on the destination edge server. This loss of training data results in increased overall training time. At least some embodiments herein include techniques for moving devices that migrate partially trained FL models of a computational device from an origin edge server to a destination edge server.

When multiple computational devices participate in some forms of SL, the computational devices train in a sequential round robin fashion whereby only one computational device is connected to a central server at a time. Other forms of SL, such as SplitFed and FedAdapt, enable simultaneous training of all participating computational devices and at the same time leverage on partitioning the DNN, for example, to alleviate the computational burden of training on the computational device. In addition to the underlying approaches of SplitFed, FedAdapt incorporates a reinforcement learning approach to dynamically identify DNN layers for offloading from a computational device to a server based on the operational conditions of the environment.

SplitFed reduces the amount of computation carried out on the device, enabling increases in efficiency over other forms of SL. However, there is currently no consideration of computational device mobility during training, nor migration of edge-based FL when computational devices move geographically such that the nearest edge server changes. At least some embodiments herein address the mobility challenge of devices in edge-based FL.

Three contributing factors, namely model training, imbalanced data distribution and frequency of device mobility are considered to impact the training time in edge-based FL.

Due to mobility, a computational device participating in FL has potential to disconnect from one edge server and connect to another server at any stage during cooperative training. For example, in the early iterations of cooperative training, if a computational device starts to move, restarting training on a different edge server results in a small increase in training time. However, if the computational device completes a larger portion of its training on the edge server before moving, then the training time would significantly increase. At least some embodiments herein set forth a migration mechanism that enables mobile computational devices to resume training on the destination edge server rather than start over.

In an edge-based FL system, some computational devices may have more data than others due to frequent use of specific services or have more resources, such as memory. Consequently, these computational devices have potential to make a significant contribution to the quality or overall accuracy of the global model. However, when computational devices that generate a large amount of data are removed from contributing to training, the eventual accuracy of the global model will be adversely affected. Furthermore, computational devices with more data use more training time. As a result, restarting training for such a computational device after that computational device has moved to a different edge server will increase the training time. A migration mechanism that enables such computational devices to resume training, rather than restarting, when moving between edge servers reduces training time while maintaining the global model accuracy.

The frequency with which computational devices move between edge servers impacts training time. As frequency of computational device movement during training increases, overall training time increases in situations where training is restarted on each computational device after moving to a different edge server.

At least some embodiments of the present invention aim to address the device mobility challenge by taking into account the foregoing factors for reducing training time and maintaining accuracy of the global model to that of classic FL. At least some embodiments of the present invention overcome the mobility challenge by migrating model data from the source edge server to the destination edge server.

In at least some embodiments, to initialize the neural network model, the DNN that would in classic FL be trained on a computational device is split between the computational device and the edge server. In at least some embodiments, after all computational devices and edge servers complete local training on the data generated by the computational device, such as through forward and backward propagation, the local model updates are sent to the central server for global model aggregation. In at least some embodiments, a complete forward and backward propagation corresponds to one local epoch, which is one complete cycle of an entire dataset on a computational device through the neural network, of a computational device for all local data of that computational device. In at least some embodiments, the central server aggregates the local neural network model instances, and then the updated parameters of the global model are sent back to the edge servers and computational devices for another round of FL training.

At least some embodiments herein include a technique for migrating DNNs in edge-based FL. When a device moves from an edge server to a destination server after 50% of FL training is completed, then the training time using the migration technique of at least some embodiments herein is reduced by up to 33% compared to the training time when restarting training on the destination server. Similarly, there is a 45% reduction in training time when a device moves to a destination server after 90% FL training is completed. There is no reduction in accuracy in at least some embodiments herein.

At least some embodiments of the present invention comprise an edge-based distributed FL system that caters for mobility of devices. At least some embodiments of the present invention include a hierarchical structure that comprises three entities: computational devices, edge servers, and a central server, such as cloud server.

Figure 1:
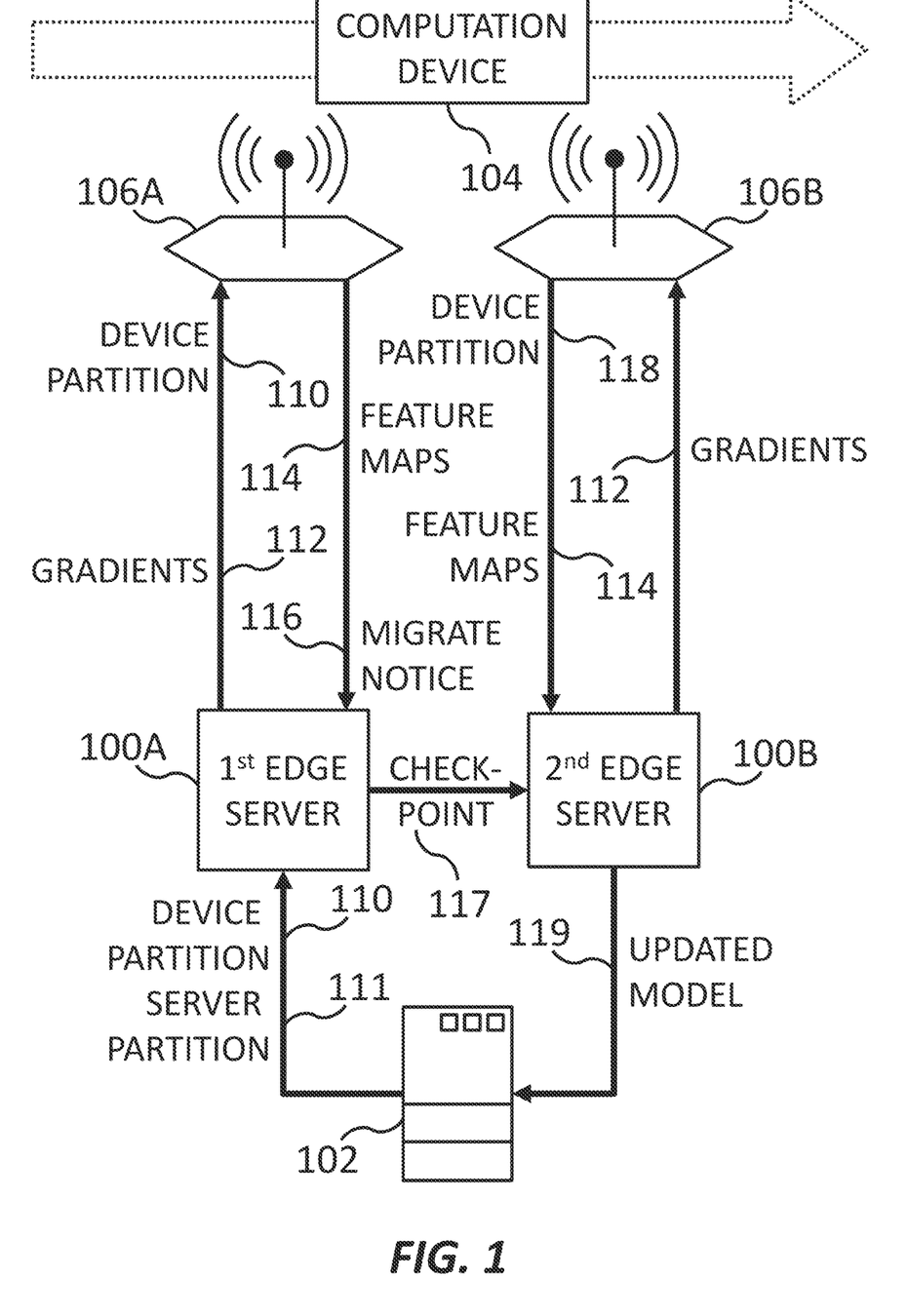
FIG. 1 is a block diagram of a system for cooperative training migration during federated learning, according to at least some embodiments of the present invention.

FIG. 1 is a block diagram of a system for cooperative training migration during federated learning, according to at least some embodiments of the present invention. The system includes a first edge server 100A, a second edge server 100B, a central server 102, a computation device 104, a first access point 106A, and a second access point 106B.

In at least some embodiments, first edge server 100A and second edge server 100B are servers configured for cooperative training with a computational device, such as computational device 104. In at least some embodiments, first edge server 100A and second edge server 100B are configured to perform calculations to train a neural network or other machine learning function, and to transmit data checkpoints for migration. First edge server 100A communicates with computation device 104 through first access point 106A, and second edge server 100B communicates with computation device 104 through first access point 106A. In at least some embodiments, communication between a computation device and edge servers does not depend on an access point to which a computation device is connected. First edge server 100A is configured to receive a device partition 110 and a server partition 111 from central server 102, and to transmit device partition 110 to computation device 104 through first access point 106A. In at least some embodiments, first edge server 100A and second edge server 100B are configured to cooperatively train a model comprising device partition 110 and server partition 111 by transmitting gradients 112 to computation device 104, and receiving feature maps 114 from computation device 104.

In at least some embodiments, central server 102 is configured to perform federated learning of a neural network model. In at least some embodiments, central server 102 is a server, a plurality of servers, or a portion of a server, a virtual instance of cloud computing, etc. In at least some embodiments, central server 102 partitions a neural network model for each of a plurality of computation devices, including computation device 104. In at least some embodiments, central server 102 is configured to receive an updated model, such as updated model 119, for each computation device among the plurality of computation devices.

In at least some embodiments, computation device 104 is configured to perform calculations to train a neural network or other machine learning function. In at least some embodiments, computation device 104 is a mobile device, such as a notebook computer, handheld computer, or even an Internet-of-Things (IoT) computation device, such as a watch, a camera, a speaker, a light, or anything else capable of performing calculations to train a neural network or other machine learning function. In at least some embodiments, computation device 104 physically moves from an area within communication range of first access point 106A to an area within communication range of second access point 106B. In at least some embodiments, computation device 104 is a desktop computer, local network server, or other device that is not considered mobile. In at least some embodiments, computation device 104 is in communication with first edge server 100A and second edge server 100B, and is configured to communicate with the edge server of least traffic.

In at least some embodiments, computation device 104 is configured to transmit a migration notice 116 to first edge server 100A, migration notice 116 indicating that computation device 104 will cease cooperative training with first edge server 100A and resume cooperative training with second edge server 100B. In at least some embodiments, first edge server 100A is configured to transmit a data checkpoint 117 in response to receiving migration notice 116. In at least some embodiments, first edge server 100A is configured to create data checkpoint 117 in response to receiving migration notice 116. In at least some embodiments, first edge server 100A is configured to periodically create data checkpoint 117. In at least some embodiments, data checkpoint 117 includes the gradient values and the weight values of server partition 111, and a loss value and an optimizer state of the current iteration of cooperative training. In at least some embodiments, the optimizer state is an optimization algorithm such as gradient descent, stochastic gradient decent, stochastic gradient descent with a learning rate of 0.01 and a momentum of 0.9, etc., or an identifier representing the optimization algorithm. In at least some embodiments, data checkpoint 117 further includes an epoch value representing a number of iterations of cooperative training performed. In at least some embodiments, second edge server 100B receives data checkpoint 117 and resumes cooperative training with computation device 104, until an updated model 119 is produced. In at least some embodiments, second edge server 100B is configured to transmit updated model 119 to central server 102 in response to completing cooperative training.

Figure 2:
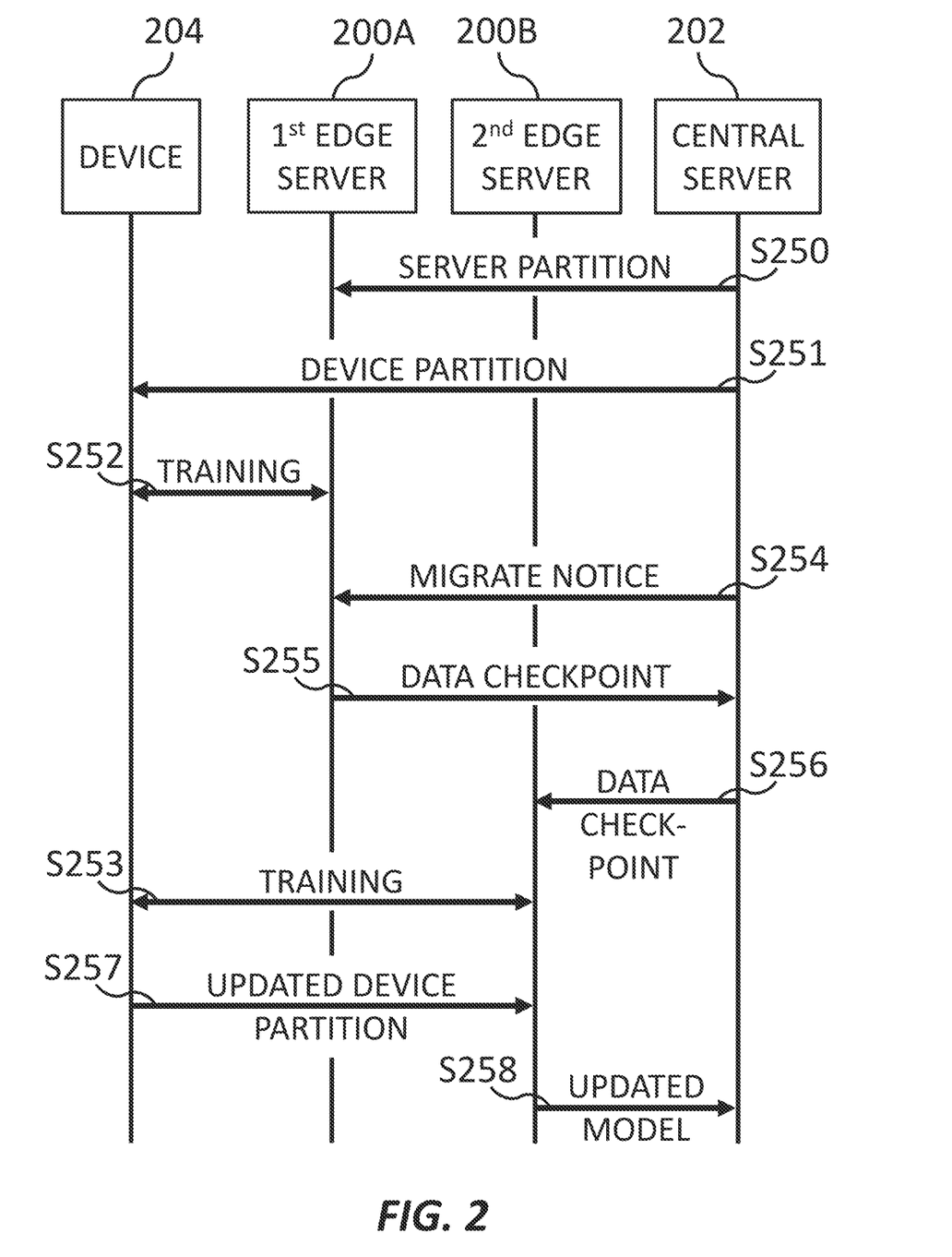
FIG. 2 is a communication flow for cooperative training migration during federated learning, according to at least some embodiments of the present invention.

FIG. 2 is a communication flow for cooperative training migration during federated learning, according to at least some embodiments of the present invention. The communication flow is conducted to perform a process of cooperative training migration during federated learning. In at least some embodiments, the communication flow is conducted among a computation device 204, first edge server 200A, second edge server 200B, and a central server 202.

At S250, central server 202 transmits a server partition of neural network model to a first edge server 200A. In at least some embodiments, central server 202 transmits a server partition to each of a plurality of edge servers, including edge server 200A. In at least some embodiments, the central server initializes the global model parameters and distributes them to the edge servers to begin the training process. In at least some embodiments, the model parameters are received by the edge servers and passed onto the participating computational devices. In at least some embodiments, training on the computational devices begins in response to the computational devices receiving the model parameters from the edge servers.

At S251, central server 202 transmits a device partition of a neural network model to computation device 204. In at least some embodiments, central server 202 transmits the device partition directly to computation device 204. In at least some embodiments, central server 202 transmits the device partition to computation device 204 via first edge server 200A. In at least some embodiments, first edge server 200A receives the device partition and the server partition from central server 202, and transmits the device partition to computational device 204.

At S252, computation device 204 and first edge server 200A engage in cooperative training of the neural network model. In at least some embodiments, the cooperative training process proceeds as described below with respect to FIG. 4.

At any point during training, it is possible for a computational device to move between edge servers. In at least some embodiments, when a computational device disconnects from a source edge server and then connects to a destination edge server without using a migration mechanism, all rounds of training are lost, and training is restarted on the destination edge server. At least some embodiments herein migrate the model data from the source edge server to the destination edge server before training resumes.

At S254, central server 202 transmits a migration notice to first edge server 200A. In at least some embodiments, the migration notice indicates that computation device 204 will cease cooperative training with first edge server 200A and resume cooperative training with second edge server 200B. In at least some embodiments, central server 202 transmits the migration notice in response to detecting physical movement of computation device 204. In at least some embodiments, central server 202 transmits the migration notice in response to detecting a faster communication speed potential of computation device 204 with second edge server 200B than the current communication speed with first edge server 200A. In at least some embodiments, when a computational device starts to move, the computational device notifies the source edge server to prepare data for migration to the destination edge server.

There are several possible ways to transfer model data between edge-servers in embodiments herein. In at least some embodiments of the present invention, the source edge server transfers data to the destination edge server, after which the computational device resumes training. In at least some embodiments, the computational device transfers the checkpointed data between edge servers, such as when the two-edge servers are not be connected or do not have permission to share data with each other. In at least some embodiments, once the computational device connects to a destination edge server, the data is transferred from the computational device to that edge server.

At S255, first edge server 200A transmits a data checkpoint to central server 200. In at least some embodiments, first edge server 200A transmits the data checkpoint in response to receiving the migration notice. In at least some embodiments, first edge server 200A transmits the data checkpoint to second edge server 200B through central server 202.

At S256, central server 202 transmits the data checkpoint to second edge server 200B. In at least some embodiments, central server 202 relays the transmission of the data checkpoint from first edge server 200A to second edge server 200B. In at least some embodiments, central server 202 routes a communication path for transmission of the data checkpoint from first edge server 200A to second edge server 200B.

At S253, computation device 204 and second edge server 200A resume cooperative training of the neural network model. In at least some embodiments, the cooperative training process proceeds as described below with respect to FIG. 4. In at least some embodiments, when a computational device connects to the destination edge server, training is resumed from the point where the computational device started moving at the source edge server. In at least some embodiments, the device resumes training at the destination edge server with reduced data transfer time between edge servers.

At S257, computation device 204 transmits an updated device partition to second edge server 200B. In at least some embodiments, computation device 204 transmits the updated device partition in response to determining that a termination condition has been met, such as a threshold loss, set number training iterations, etc. In at least some embodiments, computation device 204 transmits the updated device partition to central server 202 through second edge server 200B.

At S258, second edge server 200B transmits an updated model to central server 202. In at least some embodiment, second edge server 200B transmits the updated model in response to receiving the updated device partition from computation device 204. In at least some embodiments, second edge server 200B combines the updated device partition with an updated server partition to form the updated model. In at least some embodiments, second edge server 200B transmits the updated server partition to second edge server 200B separately from the updated device partition.

Figure 3:
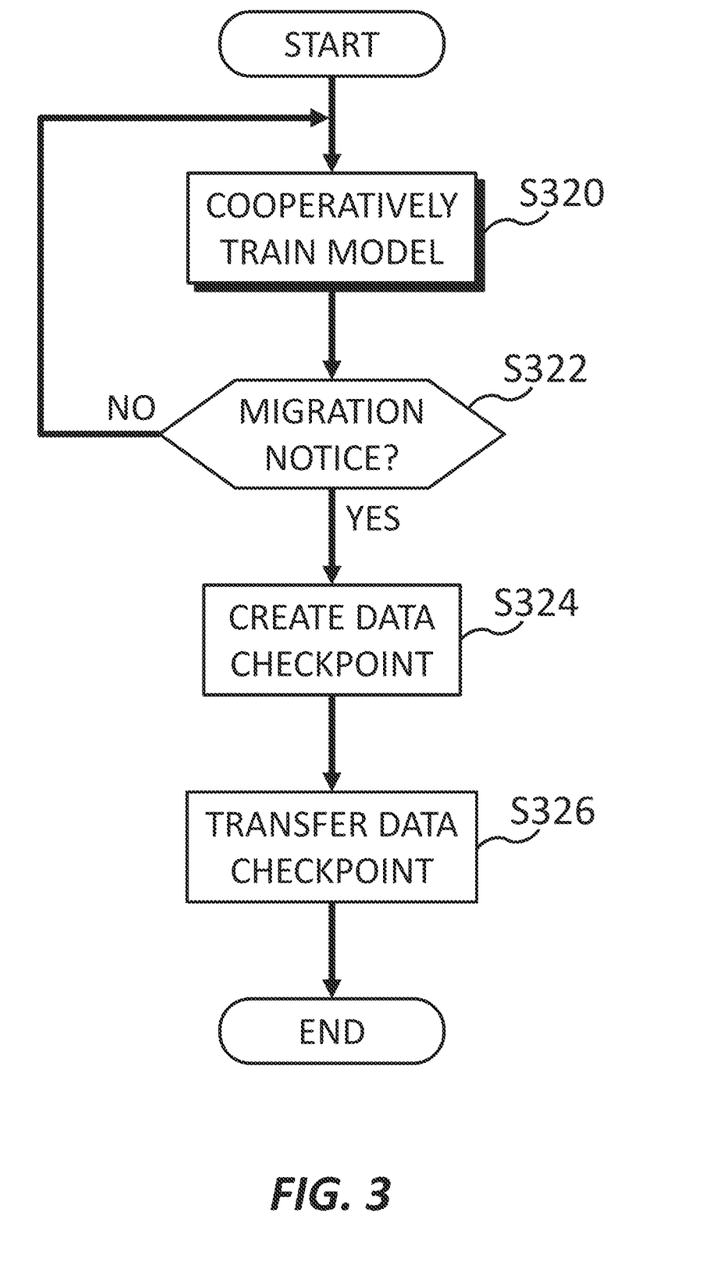
FIG. 3 is an operational flow for cooperative training migration during split learning, according to at least some embodiments of the present invention.

FIG. 3 is an operational flow for cooperative training migration during split learning, according to at least some embodiments of the present invention. The operational flow provides a method of cooperative training migration during split learning. In at least some embodiments, the method is performed by a controller of an edge server including sections for performing certain operations, such as the controller and edge server shown in FIG. 7, which will be explained hereinafter.

At S320, a training section cooperatively trains a model with a device. In at least some embodiments, the training section trains, cooperatively with a computational device through a network, the neural network model. In at least some embodiments, the cooperative training process proceeds as described below with respect to FIG. 4.

At S322, a migrating section or a sub-section thereof determines whether there is a migration notice. In at least some embodiments, the migrating section determines whether a migration notice has been received by the computational device or a central server. That is, in at least some embodiments the migration notice is received from the computational device, and in at least some embodiments the migration notice is received from a central server. In at least some embodiments, the migrating section of the controller receives, during the iterations of training, a migration notice, the migration notice including an identifier of a second edge server. If the migrating section determines that there is a migration notice, then the operational flow proceeds to data checkpoint creation at S324. If the migrating section determines that there is a migration notice, then the operational flow returns to cooperative training at S320.

At S324, a creating section creates a data checkpoint. In at least some embodiments, the creating section creates, during the iterations of training, a data checkpoint, the data checkpoint including the gradient values and the weight values of the server partition, the loss value, and an optimizer state. In at least some embodiments, the creating section creates the data checkpoint in response to receiving a migration notice. In at least some embodiments, the creating section creates the data checkpoint in response to receiving a migration notice as long as more than a threshold proportion of the training task has been completed. In at least some embodiments, the creating section creates the data checkpoint periodically during iterations of training. In at least some embodiments, the creating section creates the data checkpoint periodically after a threshold proportion of the training task has been completed. In at least some embodiments, the threshold proportion is based on an estimate of an amount of the training task after which continuing the training task via migration is more efficient than restarting the training task. In at least some embodiments, the source edge server creates a data checkpoint that includes the epoch number, gradients, model weights, loss value, and state of optimizer (such as Gradient Descent). In at least some embodiments, the checkpointed data is then transferred to the destination edge server.

At S326, a transferring section transfers the data checkpoint. In at least some embodiments, the transferring section transfers, during the iterations of training, the data checkpoint to the second edge server. In at least some embodiments, the transferring section transfers the data checkpoint in response to creating the data checkpoint. In at least some embodiments, the transferring section transfers the data checkpoint created most recently.

In at least some embodiments, the first edge server and the second edge server are part of a federated learning network wherein any edge server has potential to be instructed to perform cooperative learning from the beginning or from a migration. In at least some embodiments, the first edge server is instructed to perform cooperative learning from a migration from the second edge server in the process of federated learning to train a different model. In at least some embodiments, the first edge server receives a second data checkpoint from the second edge server, the second data checkpoint including gradient values and weight values of a second server partition, a second loss value, and a second optimizer state, the second server partition being a portion of a second neural network model, the second neural network model including a second plurality of layers partitioned into a second device partition and the second server partition, resumes iterations of training, cooperatively with a second computational device through the network, the second neural network model, receives, from the second computational device, the second device partition having updated weight values, combines the second server partition having updated weight values with the second device partition having updated weight values to form a second neural network model having updated weight values, and transmits, to the central server, the second neural network model having updated weight values.

Figure 4:
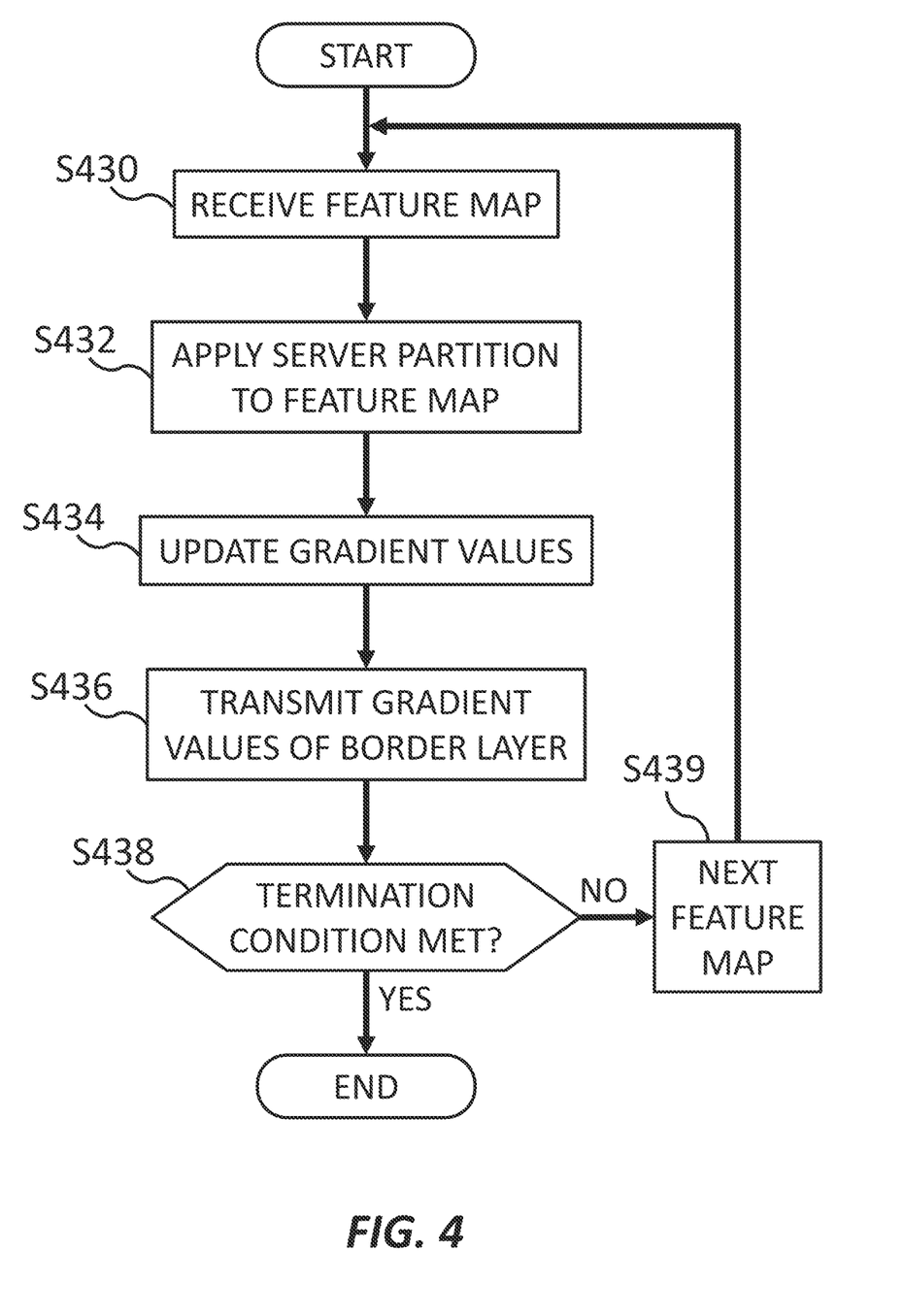
FIG. 4 is an operational flow for cooperative training, according to at least some embodiments of the present invention.

FIG. 4 is an operational flow for cooperative training, according to at least some embodiments of the present invention. The operational flow provides a method of cooperative training. In at least some embodiments, the method is performed by a training section of an edge server, such as the edge server shown in FIG. 7, which will be explained hereinafter.

At S430, the training section or a sub-section thereof receives a feature map. In at least some embodiments, the training section receives, from a computational device, a feature map output from a device partition of a neural network model, the neural network model including a plurality of layers partitioned into the device partition and a server partition. In at least some embodiments, the training section receives the feature map from the computational device through a wireless network. In at least some embodiments, the training section receives the feature map from the computational device through a wide area radio access network.

At S432, the training section or a sub-section thereof applies the server partition to the feature map. In at least some embodiments, the training section causes the server partition to perform calculations as data of the feature map is moved from the input layer to the output layer. In at least some embodiments, the training section applies the server partition to the feature map to obtain data from the output layer of the server partition. In at least some embodiments, the data from the output layer includes characteristics from which a loss can be calculated. In at least some embodiments, the data from the output layer is comparable to the feature map.

At S434, the training section or a sub-section thereof updates gradient values. In at least some embodiments, the training section updates gradient values and weight values of the layers of the server partition based on a loss function relating feature maps to output of the server partition. In at least some embodiments, the training section applies a loss function based on further information. In at least some embodiments, the training section updates the gradient values according to an optimizer state, such as gradient descent, stochastic gradient descent, or any other optimization algorithm.

At S436, the training section or a sub-section thereof transmits the gradient values of the border layer of the server partition. In at least some embodiments, the training section transmits, to the computational device, gradient values of a layer bordering the device partition and a loss value of the loss function. In at least some embodiments, the training section transmits information to the computational device that is necessary to complete a process of backpropagating the calculation of gradient values through the layers of the device partition.

At S438, the training section or a sub-section thereof determines whether a termination condition is met. In at least some embodiments, the termination condition is met once a predetermined number of iterations have been completed, an iteration being one cycle of the operations at S430, S432, S434, and S436. In at least some embodiments, the termination condition is met once the loss value falls below a threshold value. If the controller determines that the termination condition has not been met, then the operational flow returns to feature map reception at S430 to receive the next feature map (S439). If the controller determines that the termination condition has been met, then the operational flow ends.

Figure 5:
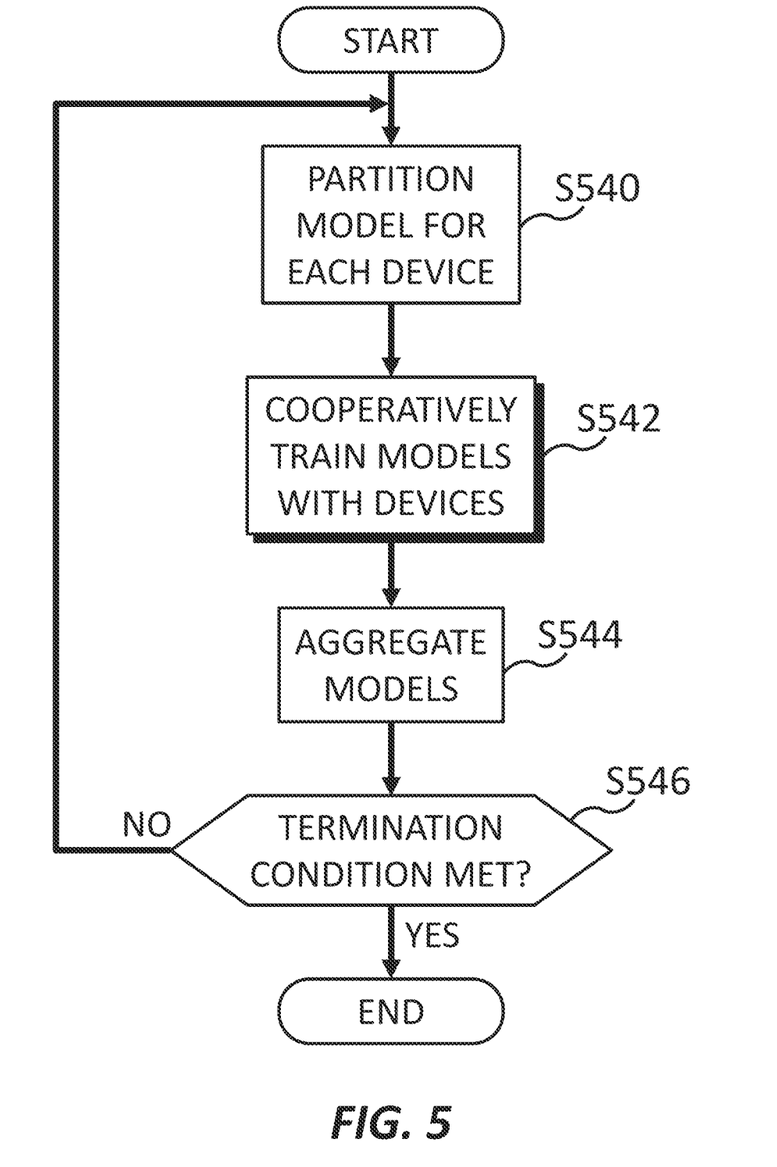
FIG. 5 is an operational flow for federated learning, according to at least some embodiments of the present invention.

FIG. 5 is an operational flow for federated learning, according to at least some embodiments of the present invention. The operational flow provides a method of federated learning. In at least some embodiments, the method is performed by a central server, such as central server 102 shown in FIG. 1.

At S540, the central server or section thereof partitions a neural network model for each computational device. In at least some embodiments, the central server partitions a plurality of layers of a neural network model into a device partition and a server partition. In at least some embodiments, the central server partitions the neural network model so that each device partition has the same number of layers. In at least some embodiments, the central server varies the number of layers in each device partition, such as based on the computational resources of the corresponding computational device. In at least some embodiments, the central server partitions the aggregated neural network model of a previous round of federated learning. In at least some embodiments, the central server partitions the neural network model to allocate the first two convolutional layers to the computational devices, and the remaining one convolutional layer and two fully connected layers to the edge servers.

At S542, the central server or section thereof cooperatively trains the neural network models with the computational device. In at least some embodiments, the central server trains, by causing a first edge server among a plurality of edge servers to cooperatively train with a computational device through the network, the neural network model by performing iterations of a cooperative training process, such as cooperative training process as described with respect to FIG. 4. In at least some embodiments, the central server transmits device partitions and server partitions to respective devices and edge servers along with instructions to cooperatively train. In at least some embodiments, the central server receives trained partitions of the neural network model once the cooperative training process is complete. In at least some embodiments, the central server detects a migration condition and facilitates a migration, as further explained below with respect to FIG. 6.

At S544, the central server or section thereof aggregates the trained neural network model instances. In at least some embodiments, the central server aggregates the updated weight values of neural network model instances received from a plurality of edge servers to generate an updated neural network model. In at least some embodiments, the central server aggregates the neural network model instances using methods such as Federated Averaging. In at least some embodiments, the central server averages the gradient values across the neural network model instances, and calculates the weight values of a global neural network model accordingly. In at least some embodiments, the central server averages the weight values across the neural network model instances. In at least some embodiments, each computational device applies a different amount of training data at S542, and the central server averages the weight values across the neural network model instances proportionally to the number of samples of training data applied at S542. In at least some embodiments, the central server performs multiple rounds of federated learning, each round of federated learning completed upon the aggregating section generating the updated global neural network model.

At S546, the central server or section thereof determines whether a termination condition has been met. In at least some embodiments, the termination condition is met when a number of completed rounds of federated learning is reached. In at least some embodiments, the termination condition is met when the training loss convergences. In at least some embodiments, the termination condition is met when a time limit is exceeded. If the central server determines that the termination condition has not been met, then the operational flow returns to neural network model partitioning at S540. If the central server determines that the termination condition has been met, then the operational flow ends.

Figure 6:
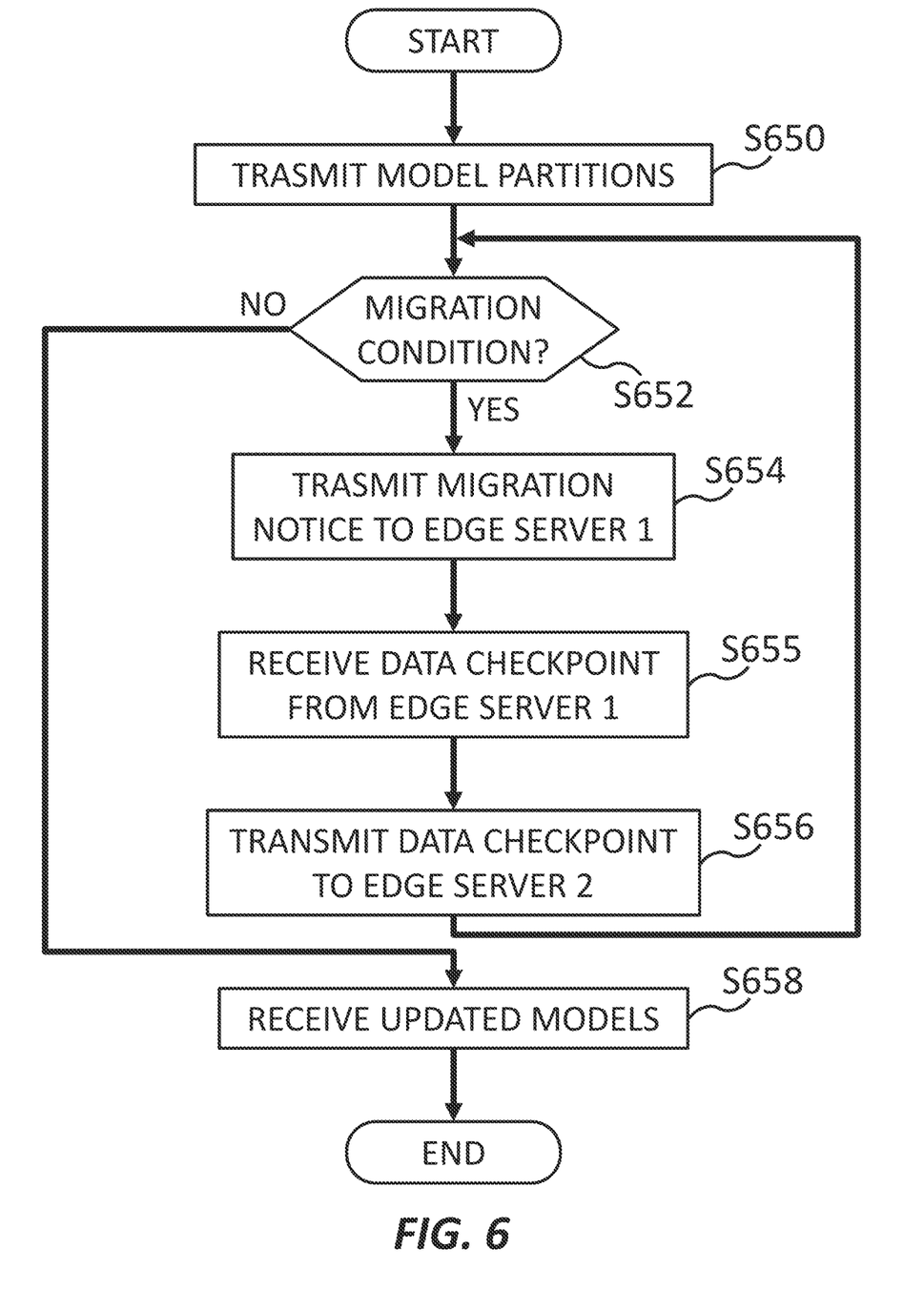
FIG. 6 is an operational flow for cooperative training migration during federated learning, according to at least some embodiments of the present invention.

FIG. 6 is an operational flow for cooperative training migration during federated learning, according to at least some embodiments of the present invention. The operational flow provides a method of cooperative training migration during federated learning. In at least some embodiments, the method is performed by a central server, such as central server 102 shown in FIG. 1.

At S650, the central server or a section thereof transmits model partitions. In at least some embodiments, the central server transmits, to each computational device, a corresponding device partition, and transmits, to each edge server, a corresponding server partition. In at least some embodiments, the central server transmits the partitions once at the beginning of each round of the federated learning process. In at least some embodiments, the central server transmits partitions to all computational devices and edge servers at substantially the same time. In at least some embodiments, the central server transmits a device partition and a server partition to each edge server, and causes the edge server to transmit the device partition to a cooperating computational device.

At S652, the central server or a section thereof determines whether there is a migration condition. In at least some embodiments, the central server detects, during the iterations of training, a condition for migration from the first edge server to a second edge server. In at least some embodiments, conditions for migration include deteriorated bandwidth between the first edge server and the computational device, discovery of a higher bandwidth path to the computational device from the second edge server, significant geographical movement of the computational device, or other conditions where migration would result in faster training. In at least some embodiments, the detecting includes receiving, during the iterations of training, a migration notice including an identifier of the second edge server from the computation device. In at least some embodiments, the central server selects the second edge server. In at least some embodiments, the central server only determines that there is a migration condition if the migration process and resumption of training would require less time than restarting the iteration of training. For example, if training has just begun when the bandwidth deteriorates, then migration is not likely to require less time than restarting the iteration of training. In at least some embodiments, the detecting includes determining that a threshold number of iterations of training have been performed. If the central server determines that there is a migration condition, then the operational flow proceeds to migration notice transmission at S654. If the central server determines that there is not a migration condition, then the operational flow proceeds to update models reception at S658.

At S654, the central server or a section thereof transmits a migration notice to the first edge server. In at least some embodiments, the central server transmits a migration notice to the first edge server. In at least some embodiments, the central server transmits a migration notice including information for communicating with the second edge server, such as a network address and any credentials required. In at least some embodiments, the central server transmits a migration notice including an indication that the central server will facilitate the migration process.

At S655, the central server or a section thereof receives checkpoint data from the first edge server. In at least some embodiments, the central server receives a data checkpoint from the first edge server, the data checkpoint including the gradient values and the weight values of the server partition, the loss value, and an optimizer state. In at least some embodiments, the central server facilitates transfer of the data checkpoint from the first edge server to an intermediate storage nearby the first edge server and/or the second edge server.

At S656, the central server or a section thereof transmits the checkpoint data to the second edge server. In at least some embodiments, the central server transfers, during the iterations of training, the data checkpoint to the second edge server. In at least some embodiments, the central server facilitates transfer of the data checkpoint to the second edge server from an intermediate storage nearby the first edge server and/or the second edge server. Once the central server transmits the data checkpoint to the second edge server, the operational flow returns to migration condition detection at S652. In at least some embodiments, the central server determines multiple migrations during training. In subsequent migrations, the second edge server becomes the first edge server for the operations at S654, S655, and S656. Moreover, at least some embodiments of the present invention incur a negligible overhead of two seconds, which includes the time for transferring the checkpoint data between edge servers.

At S658, the central server or a section thereof receives updated neural network model instances. In at least some embodiments, the central server receives, from the second edge server, a combination of the server partition having updated weight values with the device partition having updated weight values forming a neural network model having updated weight values. In at least some embodiments, the central server receives the server partition from the second edge server and the device partition from the computational device, and combines the partitions to form the updated neural network model instance.

Figure 7:
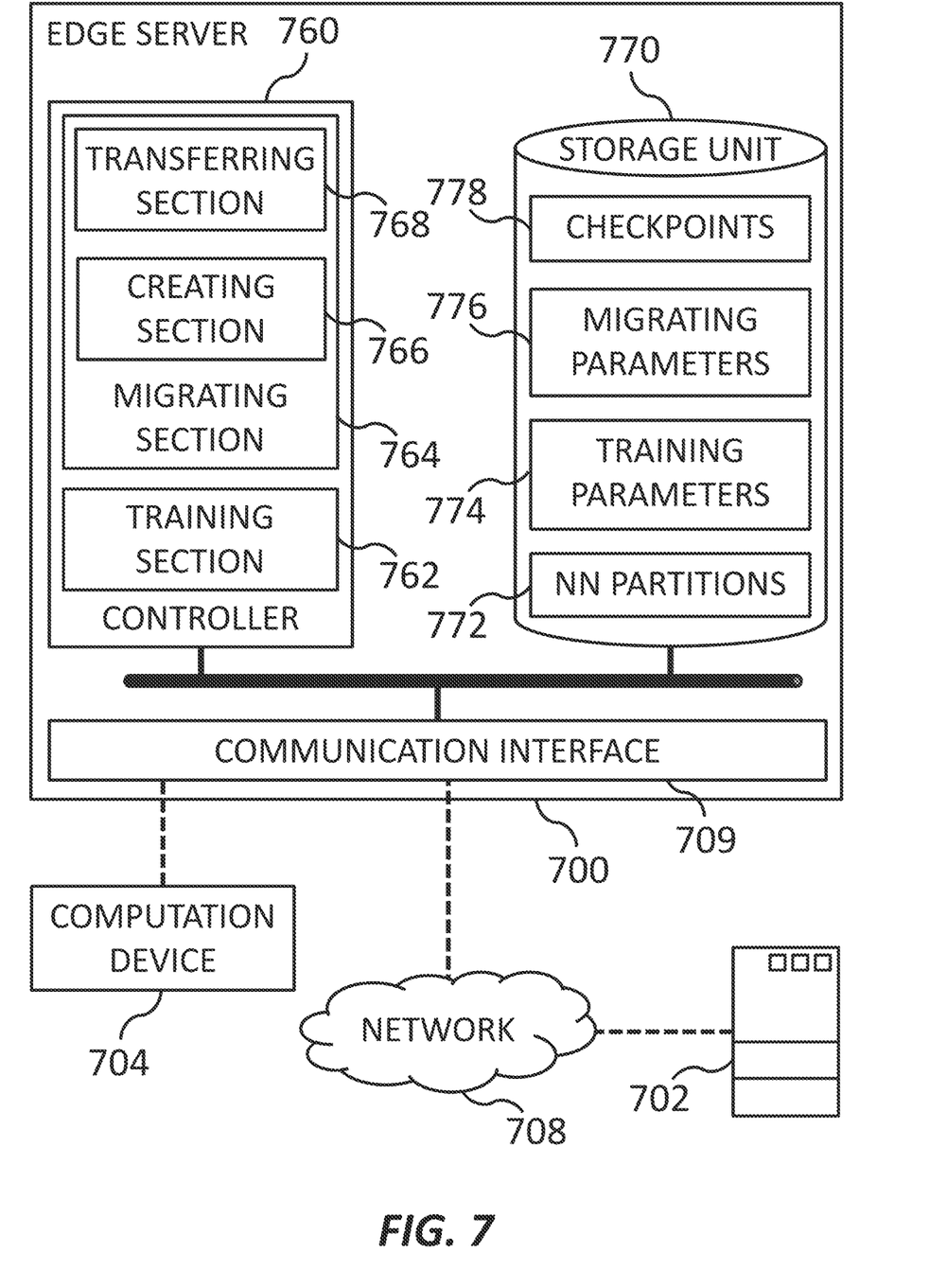
FIG. 7 is a block diagram of a hardware configuration for cooperative training migration, according to at least some embodiments of the present invention.

FIG. 7 is a block diagram of a hardware configuration for cooperative training migration, according to at least some embodiments of the present invention.

The exemplary hardware configuration includes edge server 700, which interacts with computation device 704, and communicates with network 708. In at least some embodiments, edge server 700 is integrated with computation device 704. In at least some embodiments, edge server 700 is a computer system that executes computer-readable instructions to perform operations for physical network function device access.

Edge server 700 includes a controller 760, a storage unit 770, and a communication interface 709. In at least some embodiments, controller 760 includes a processor or programmable circuitry executing instructions to cause the processor or programmable circuitry to perform operations according to the instructions. In at least some embodiments, controller 760 includes analog or digital programmable circuitry, or any combination thereof. In at least some embodiments, controller 760 includes physically separated storage or circuitry that interacts through communication. In at least some embodiments, storage unit 770 includes a non-volatile computer-readable medium capable of storing executable and non-executable data for access by controller 760 during execution of the instructions. Communication interface 709 transmits and receives data from network 708.

Controller 760 includes training section 762, migrating section 764, creating section 766, and transferring section 768. Storage unit 770 includes neural network partitions 772, training parameters 774, migrating parameters 776, and checkpoints 778.

Training section 762 is the circuitry or instructions of controller 760 configured to train at least server partitions of neural network models. In at least some embodiments, training section 762 is configured to train, cooperatively with a computational device through a network, a neural network model. In at least some embodiments, training section 762 utilizes information in storage unit 770, such as training parameters 774, and records information in storage unit 770, such as neural network partitions 772. In at least some embodiments, training section 762 includes sub-sections for performing additional functions, as described in the foregoing flow charts. In at least some embodiments, such sub-sections is referred to by a name associated with a corresponding function.

Migrating section 764 is the circuitry or instructions of controller 760 configured to perform migrations during training. In at least some embodiments, migrating section 764 is configured to create and transfer data checkpoints. In at least some embodiments, migrating section 764 utilizes information in storage unit 770, such as neural network partitions 772 and migrating parameters 776, and records information in storage unit 770, such as checkpoints 778. In at least some embodiments, migrating section 764 includes sub-sections for performing additional functions, as described in the foregoing flow charts. In at least some embodiments, such sub-sections is referred to by a name associated with a corresponding function.

Creating section 766 is the circuitry or instructions of controller 760 configured to create data checkpoints. In at least some embodiments, creating section 766 is configured to create, during the iterations of training, a data checkpoint, the data checkpoint including the gradient values and the weight values of the server partition, the loss value, and an optimizer state. In at least some embodiments, creating section 766 utilizes information from storage unit 770, such as neural network partitions 772 and migrating parameters 776, and records information in storage unit 770, such as checkpoints 778. In at least some embodiments, creating section 766 includes sub-sections for performing additional functions, as described in the foregoing flow charts. In at least some embodiments, such sub-sections is referred to by a name associated with a corresponding function.

Transferring section 768 is the circuitry or instructions of controller 760 configured to transfer data checkpoints. In at least some embodiments, transferring section 768 is configured to transfer, during the iterations of training, the data checkpoint to the second edge server. In at least some embodiments, transferring section 768 utilizes information from storage unit 770, such as migrating parameters 776 and checkpoints 778. In at least some embodiments, creating section 766 includes sub-sections for performing additional functions, as described in the foregoing flow charts. In at least some embodiments, such sub-sections is referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, cooperative training migration is performed by training, cooperatively with a computational device through a network, the neural network model, creating, during the iterations of training, a data checkpoint, the data checkpoint including the gradient values and the weight values of the server partition, the loss value, and an optimizer state, receiving, during the iterations of training, a migration notice, the migration notice including an identifier of a second edge server, and transferring, during the iterations of training, the data checkpoint to the second edge server.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable storage medium including instructions executable by a first server to cause the first server to perform operations comprising:
   training, cooperatively with a computational device through a network, the neural network model by performing iterations of
      receiving, from the computational device, a feature map output from a device partition of a neural network model, the neural network model including a plurality of layers partitioned into the device partition and a server partition,
      applying the server partition to the feature map,
      updating gradient values and weight values of the layers of the server partition based on a loss function relating feature maps to output of the server partition, and
      transmitting, to the computational device, gradient values of a layer bordering the device partition and a loss value of the loss function,
   creating, during the iterations of training, a data checkpoint, the data checkpoint including the gradient values and the weight values of the server partition, the loss value, and an optimizer state;
   receiving, during the iterations of training, a migration notice, the migration notice including an identifier of a second edge server; and
   transferring, during the iterations of training, the data checkpoint to the second edge server;
   wherein the second edge server
      receives the data checkpoint, and resumes the iterations of training, cooperatively with the computational device through the network, the neural network model by utilizing the weight values of the server partition of the data checkpoint during the applying and the updating of a first iteration by the second edge server.

2. The computer-readable storage medium of claim 1, wherein the operations further comprise
receiving the device partition and the server partition from a central server; and
transmitting the device partition to the computational device.

3. The computer-readable storage medium of claim 1, wherein the data checkpoint is created in response to receiving the migration notice.

4. The computer-readable storage medium of claim 1, wherein the data checkpoint is created periodically.

5. The computer-readable storage medium of claim 1, wherein the migration notice is received from the computational device.

6. The computer-readable storage medium of claim 1, wherein the migration notice is received from a central server.

7. The computer-readable storage medium of claim 1, wherein the data checkpoint further includes an epoch value representing a number of iterations of training performed.

8. The computer-readable storage medium of claim 1, wherein the operations further comprise:
receiving a second data checkpoint from the second edge server, the second data checkpoint including gradient values and weight values of a second server partition, a second loss value, and a second optimizer state, the second server partition being a portion of a second neural network model, the second neural network model including a second plurality of layers partitioned into a second device partition and the second server partition;
resuming iterations of training, cooperatively with a second computational device through the network, the second neural network model;
receiving, from the second computational device, the second device partition having updated weight values; and
combining the second server partition having updated weight values with the second device partition having updated weight values to form a second neural network model having updated weight values.

9. The computer-readable storage medium of claim 8, wherein the operations further comprise transmitting, to a central server, the second neural network model having updated weight values.

10. A computer-readable storage medium including instructions executable by a central server to cause the central server to perform operations comprising:
partitioning a plurality of layers of a neural network model into a device partition and a server partition;
training, by causing a first edge server among a plurality of edge servers to cooperatively train with a computational device through the network, the neural network model by performing iterations of
receiving, from the computational device, feature maps output from the device partition,
applying the server partition to the feature maps,
updating gradient values and weight values of the layers of the server partition based on a loss function relating feature maps to output of the server partition, and
transmitting, to the computational device, gradient values of a layer bordering the device partition,
detecting, during the iterations of training, a condition for migration from the first edge server to a second edge server;
receiving a data checkpoint from the first edge server, the data checkpoint including the gradient values and the weight values of the server partition, the loss value, and an optimizer state;
transferring, during the iterations of training, the data checkpoint to the second edge server; and
resuming the iterations of training, by causing the second edge server to cooperatively train with the computational device through the network, the neural network model by utilizing the weight values of the server partition of the data checkpoint during the applying and the updating of a first iteration by the second edge server.

11. The computer-readable storage medium of claim 10, wherein the detecting includes receiving, during the iterations of training, a migration notice including an identifier of the second edge server from the computation device.

12. The computer-readable storage medium of claim 10, wherein the detecting includes determining that a threshold number of iterations of training have been performed.

13. The computer-readable storage medium of claim 10, wherein the operations further comprise
receiving, from the second edge server, a combination of the server partition having updated weight values with the device partition having updated weight values forming a neural network model having updated weight values;
aggregating the updated weight values of neural network model instances received from a plurality of edge servers to generate an updated neural network model.

14. The computer-readable storage medium of claim 10, wherein the operations further comprise transmitting a migration notice to the first edge server.

15. A method performed by a first edge server, the method comprising:
training, cooperatively with a computational device through a network, the neural network model by performing iterations of
receiving, from the computational device, a feature map output from a device partition of a neural network model, the neural network model including a plurality of layers partitioned into the device partition and a server partition,
applying the server partition to the feature map,
updating gradient values and weight values of the layers of the server partition based on a loss function relating feature maps to output of the server partition, and
transmitting, to the computational device, gradient values of a layer bordering the device partition and a loss value of the loss function,
creating, during the iterations of training, a data checkpoint, the data checkpoint including the gradient values and the weight values of the server partition, the loss value, and an optimizer state;
receiving, during the iterations of training, a migration notice, the migration notice including an identifier of a second edge server; and
transferring, during the iterations of training, the data checkpoint to the second edge server;
wherein the second edge server
receives the data checkpoint, and resumes the iterations of training, cooperatively with the computational device through the network, the neural network model by utilizing the weight values of the server partition of the data checkpoint during the applying and the updating of a first iteration by the second edge server.

16. The method of claim 15, further comprising receiving the device partition and the server partition from a central server; and
transmitting the device partition to the computational device.

17. The method of claim 15, wherein the data checkpoint is created in response to receiving the migration notice.

18. The method of claim 15, wherein the data checkpoint is created periodically.

19. The method of claim 15, wherein the migration notice is received from the computational device.

20. The method of claim 15, wherein the migration notice is received from a central server.

* * * * *